United States Patent [19]

Muller et al.

[11] 3,791,413
[45] Feb. 12, 1974

[54] PRESSURE REDUCING VALVE SPOOL
[75] Inventors: John T. Muller, Morris Plains; James H. Cooper, Glen Rock, both of N.J.
[73] Assignee: Leslie Co., Parsippany, N.J.
[22] Filed: Mar. 23, 1972
[21] Appl. No.: 237,565

Related U.S. Application Data
[63] Continuation of Ser. No. 150,807, June 7, 1971, abandoned, which is a continuation of Ser. No. 829,612, June 2, 1969, abandoned.

[52] U.S. Cl............ 137/625.3, 137/625.34, 251/122
[51] Int. Cl......................... F16k 1/08, F16k 31/12
[58] Field of Search....... 137/625.3, 625.34, 625.37; 251/122

[56] References Cited
UNITED STATES PATENTS
| 70,919 | 11/1867 | Tucker | 137/625.3 |
| 1,582,896 | 5/1926 | Berry | 137/625.34 X |
| 2,237,554 | 4/1941 | Grove | 251/122 |
| 2,737,979 | 3/1956 | Parker | 137/625.34 |
| 3,317,184 | 5/1967 | Usry | 251/122 |
| 3,458,170 | 7/1969 | Vogeli | 251/122 |

FOREIGN PATENTS OR APPLICATIONS
| 1,075,011 | 4/1954 | France | 137/625.3 |
| 234,044 | 1911 | Germany | 251/50 |

Primary Examiner—Arnold Rosenthal

[57] ABSTRACT

Several embodiments are disclosed of various spool configurations for controlling the flow of an expandable fluid from a high pressure zone to a zone of lesser pressure. The spools structurally conform to a novel principle of controlling the expansion of the fluid from a point of initial throttling throughout the entire expansion profile provided by the valve in such a way that overexpansion of the fluid at any given point is substantially reduced or entirely eliminated.

4 Claims, 7 Drawing Figures

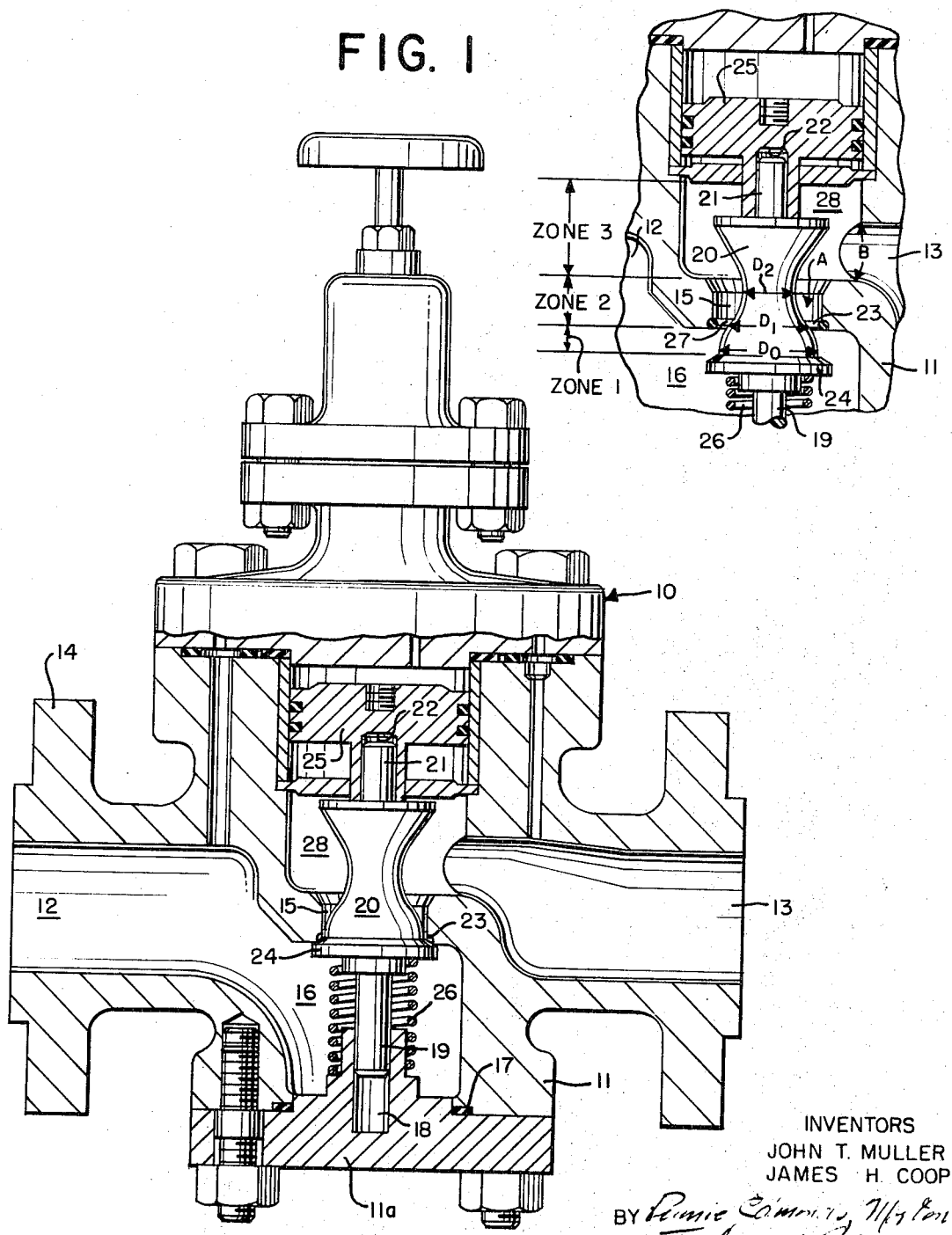

INVENTORS
JOHN T. MULLER
JAMES H. COOPER

BY Rennie, Edmonds, Morton
Taylor and Adams

ATTORNEYS 3,791,413

PRESSURE REDUCING VALVE SPOOL

This is a continuation of Ser. No. 150,807, filed June 7, 1971 and now abandoned, which was a continuation of Ser. No. 829,612, filed June 2, 1969 and now abandoned.

FIELD OF THE INVENTION

This invention relates to pressure reducing valves and the construction of internal parts thereof to eliminate noise and to provide a controlled transitional flow of expanding fluid from a high pressure zone to a zone of reduced pressure.

BACKGROUND OF THE INVENTION

Pressure valves as heretofore commonly constructed include a valve housing or casing forming an annular passage and defining at the high pressure end a valve seat which cooperates with a reciprocally movable spool. The spool when moved off its seat defines an annular orifice or throttle area through which the rapidly expanding fluid may travel. Various forms of control devices have been suggested, including vaned or grooved spools for guiding the fluid in a controlled fashion from the throttle area. Such devices, while possessing some advantages, nevertheless have overlooked the basic problem of how to design valve spools so that the spool controls the rapidly expanding fluid at all times in its transition from high to low pressure.

Accordingly, it is the purpose of the present invention to present a basic structural concept which may be used in the design of valve spools for pressure reducing valves of the above type which will greatly reduce the fluid handling problems associated with such valves.

SUMMARY OF THE INVENTION

The present invention comprises, in an expandable fluid pressure reducing valve, a valve housing of generally annular configuration adapted to connect respective zones of high and low pressure expandable fluid, the housing defining a valve seat and reciprocally mounted axially of the housing a valve spool of unique construction. In its simplest and most basic form, the spool consists of a generally hourglass shape having two bell-like sections of opposite curvature joined by a center section of neutral curvature. More specifically, the bell-shape section nearest the valve seat constitutes a throttle area together with the adjacent housing, and with respect to this initial curvature, known techniques governing such throttle control areas may be used. The second oppositely curved spool section constitutes a valve outlet control area together with the surrounding valve housing and the curvature of this spool section is regulated to cause the expanding fluid to be directed radially outward or away from the axis of the valve and to provide the expanding pressure flow at all points. The diameter of the valve spool at its mid-section or point of neutral curvature is further determined in accordance with the cross-sectional annular area as measured from the mid-point to the adjacent valve housing, such annular area being proportionally related to the minimum outlet area of the valve.

In particular embodiments, the valve spool according to the present invention may have the simple hourglass shape defined above, or superimposed upon such shape may be vanes that frictionally dissipate energy while guiding and controlling the flow throughout its passage along the valve spool. In another form, a skirt may be provided around the throttle section of the valve which helps meter throttle flow, particularly under low flow conditions.

BRIEF DESCRIPTION OF THE DRAWING

FIG. 1 is a principally cross-sectional view of a pressure reducing valve incorporating a valve spool constructed according to the principles of the present invention;

FIG. 2 is a cross-sectional view of a detail of the valve of FIG. 1 with the spool in the full open position;

DESCRIPTION OF PREFERRED EMBODIMENTS

Figure 3:
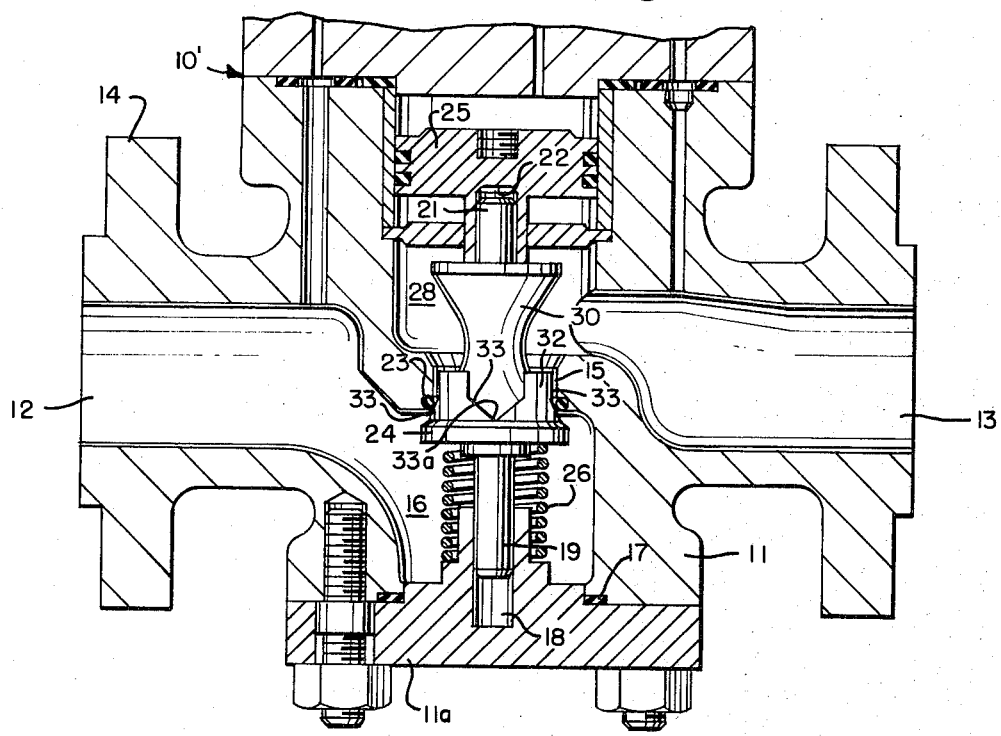
FIG. 3 is a view similar to the valve of FIG. 1 incorporating a modified spool.
Figure 4:
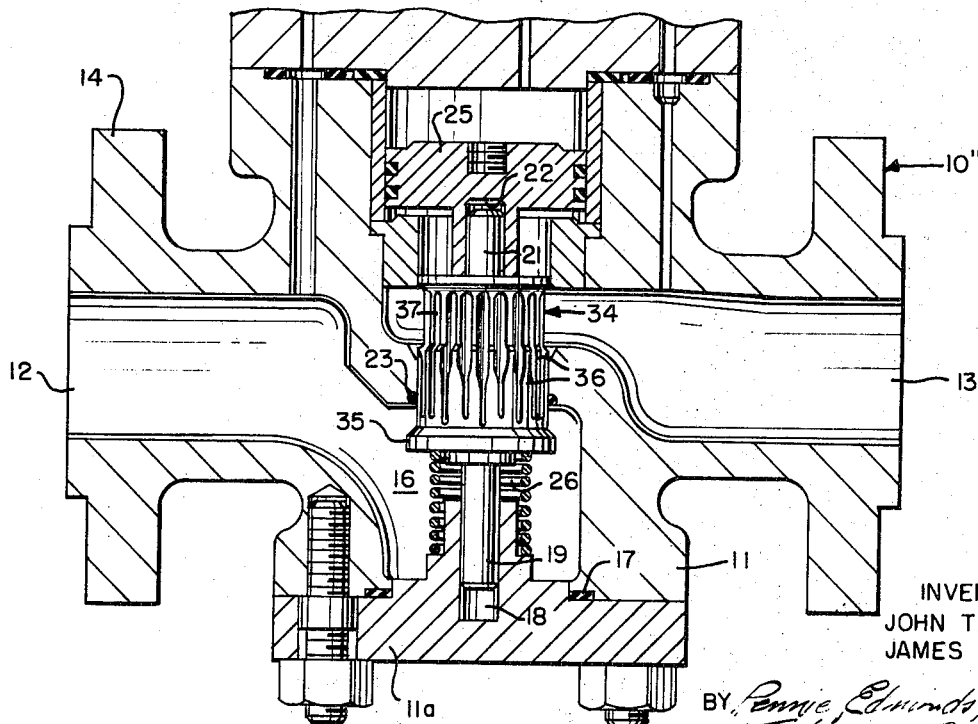
FIG. 4 is a cross-sectional view of a valve incorporating yet another embodiment of a valve spool according to the present invention.

Referring to the drawing and initially to FIG. 1 thereof, a pressure reducing valve 10 has been illustrated which comprises a housing 11 having an inlet orifice 12 and an outlet orifice 13. The orifice 12 is connected as by an annular flange 14 to admit an expandable fluid, such as steam for example, to an annular inlet chamber 16. The chamber 16 is sealed at its lower end by the cap 11a which is bolted to the housing. Seal 17 prevents leakage past the cap. The cap 11a has an axial bore 18 therein which receives spool rod 19 connected to the spool 20. At its opposite end the spool 20 has a spool rod 21 within a bore 22 formed within an actuating piston 25. The housing defines an annular body seat 23 and the spool a complementary valve seat 24. The spool is biased by means of the spring 26 so that the spool is in a normally closed position with respect to the body seat 23. When a suitable actuating pressure acting above piston 25 moves the piston downwardly, the spool 20 will move to a commensurate open position.

In FIG. 2, the spool 20 has been shown in its full open position whereby pressure fluid may pass through an area 27 between the reduced diameter portion of the spool 20 and the adjacent valve seat 23. The operation of the valve construction thus far described is conventional. It is in the particular construction of the spool 20 and the modified forms thereof as shown in FIGS. 3-7 in which the invention resides.

Accordingly, in the spool construction shown in FIG. 2, the spool's surface may be taken as consisting of three continuous fluid flow zones. The spool is in its maximum open position as shown. Zone 1 may be called the entrance zone; zone 2 constitutes an expansion zone wherein the pressure fluid first begins to expand; and zone 3 is a further expansion zone wherein the fluid is directed radially outwardly with respect to the axis of the valve.

In order to determine the curved surface of the valve spool, the curvature in zone 1 must first be determined. This is the curved surface from the valve seat to a location directly opposite the body seat 23. $D_1$ is the diameter of the valve spool opposite body seat 23. $Dl$ is the diameter which provides the annular flow area between the housing seat 23 and the valve spool to provide the maximum mass flow when the valve is in its full open position. In order to define the curvature of the spool throughout zone 1, we refer to the standard design procedure as set forth in "Control Valve Plug Design," American Society of Mechanical Engineers' Control Valve Symposium Reports of Nov. 1955.

With respect to the curvature of the valve zone throughout zone 2, $D_2$ (minimum valve spool diameter) may be approximated by the equation $D_2 = (D_o^2 - 4/\pi\ A_o)^{1/2}$ where:

$A_o$ equals the minimum area of the outlet throttle of the valve body; $D_o$ = seat ring diameter.

The foregoing equation may be solved to determine $D_2$ and the entire curved surface throughout zone 2 will provide a continuous expansion of the fluid at a decreasing rate of expansion. In order to determine the slope of the curve throughout zone 3, $D_o - C$ is the ideal diameter of the valve spool which will pass between the annular seat 23 in the seat ring 15 with a clearnace "C." The curvature of the spool throughout zone 3 is determined by the application of known flow net analysis principles, taking into account the surrounding construction of the chamber 28 in the valve housing. The curvature selected must redirect the flow of fluid to completely fill the chamber or body cavity 28 while minifying stray acceleration and further expansion of fluid and to redirect such fluid along a continuous curve from $D_2$ to provide the best flow distribution based on the aforementioned flow net analysis.

To summarize, when the valve spool shown in FIG. 2 is in its full open position, the design curvature of the spool from the spool seat 24 to $D_1$ is determined by the use of conventional design techniques which in effect determine the throttle characteristics of the valve. The result of such techniques will be to assure a gradual increased throttle opening until the maximum flow position is reached in accordance with the design flow limit. Thereafter, the curvature of the valve spool continues inwardly to a minimum diameter $D_2$ which is preferably in line with the end of the valve seat ring. The difference in the respective diameters $D_2$ and the diameter of the seat ring 15 produces an annular area $A$, which, in accordance with the given formula, in the described particular embodiment, should be substantially the equivalent of the minimum area of the outlet B. Finally, the reverse, outward curvature of the spool from its minimum diameter $D_2$ is preferably determined by the maximum diameter permissible for the valve spool to enter between the seat ring 15 and the curvature provided by flow net analysis. The body curvature is that which will cause the expanded fluid to be redirected radially outwards and to completely fill the body cavity.

Although as described above, in the particular embodiment, the respective annular area $A$ and the minimum area $B$ are substantially equal, the principle taught by the present invention is that the curvature of the spool in its dimensional relationships with surrounding portions of the housing should be such that a controlled guided flow of expanding fluid results without substantial overexpansion.

Referring now to FIG. 3, there is shown a pressure reducing valve 10' having parts corresponding to those shown in FIG. 1 which have been given the same reference numerals. Within the body of the valve housing is a spool 30 which has the generally hourglass or bell-shaped configuration described in connection with the spool shown in FIG. 2. However, the spool 30 is equipped with a skirt 32 having circumferentially, four equi-spaced notched areas 33 which provide a different throttling characteristic to the initial spool design. It will be seen that the notches 33 begin at an apex 33a which widens thereafter to permit a gradually increasing flow past sections of the skirt 32 as the valve spool is moved to an open position. Accordingly, the construction shown possesses the advantage of more gradual and controlled throttling, particularly under low throttling conditions, in combination with the basic spool contour which controls the expansion of fluid as heretofore described in the embodiments of FIGS. 1 and 2.

Figure 6:
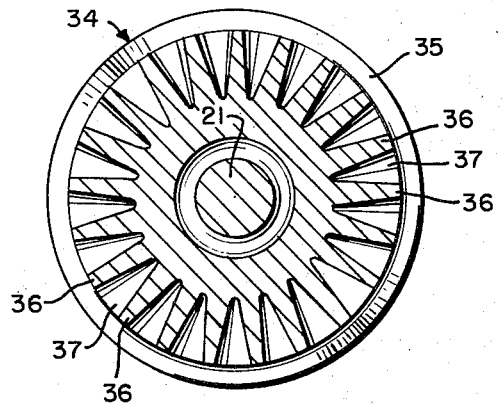
FIGS. 6 and 7 are cross-sectional views taken respectively along lines 6—6 and 7—7 of FIG. 5.
Figure 5:
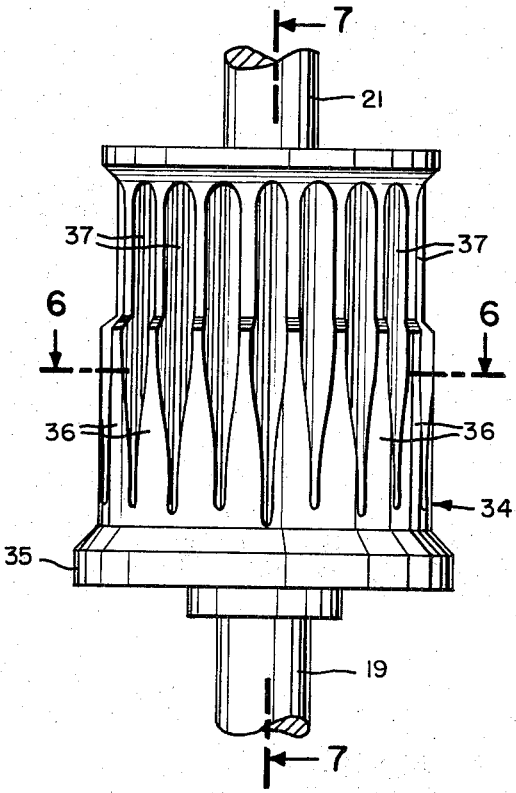
FIG. 5 is an enlarged showing of the spool of FIG. 4.
Figure 7:
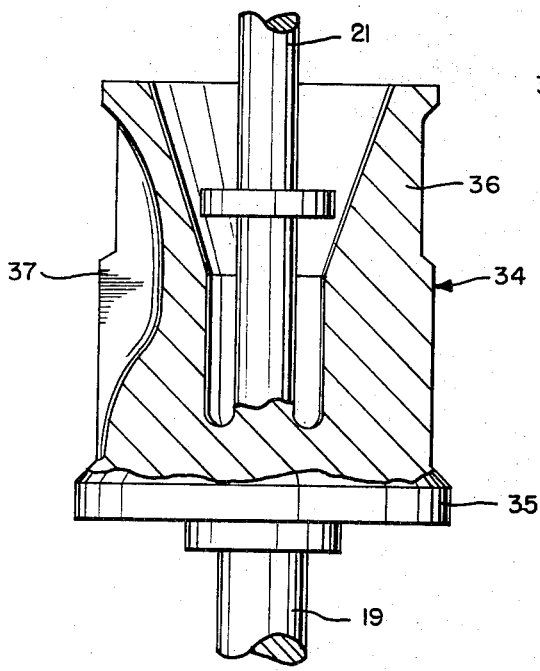

FIGS. 4–7 illustrate yet another valve spool 34 in the valve housing 10'' having other parts of the valve similar in every respect to the valves 10 and 10'. As best seen in FIGS. 5–7, the spool 34 has a valve seat 35 and a plurality of axial vanes 36 which extend lengthwise of the spool. The vanes 36, in effect, define grooves whose depths conform to the curvature shown in FIG. 7. Since such curvature is regulative according to the above-described principles, the vanes frictionally dissipate energy in an expandable fluid in a guided flow but in accordance with controlled expansion of the fluid throughout the length of the spool. As shown in FIG. 6, adjacent vanes 34 are inclined somewhat toward each other and toward the center of the spool to produce more favorable expansion and flow characteristics.

With reference to FIG. 5, it can be seen that the grooves 37 between respective vanes 34, gradually widen from a position near the seat 35 to a maximum at the section line 6—6. This widening of each groove permits gradual throttling of fluid as the seat 35 moves away from the body seat 25 toward the full throttle position. That gradually widening portion of the grooves is regarded as performing essentially a throttle function, whereas downstream portions of vanes 34 and intermediate grooves primarily control expansion. Of course, at low throttling conditions, every part of a groove 37 downstream of body seat 23 will control expansion; however, the curvature of the inward spool surface of each groove and the maximum width of each groove is regulated according to the full throttle condition.

It will be observed that in each of the foregoing embodiments, the spools constructed according to the present invention, though varying somewhat in individual design features, each have in common that the basic spool contour fully controls expansion of a fluid whose pressure is being reduced so that overexpansion of the fluid is minified. The fluid is first throttled (zone 1) and permitted to flow radially inwardly during its initial expansion (throughout zone 2) and then gradually directed radially outwardly, again at a controlled rate and substantially constant pressure (throughout zone 3) to deliver the fluid to the outlet orifice. Redirecting the fluid radially outwardly obviates what would be the tendency for the fluid to shear if the flow throughout zone 2 were to continue in a direction toward the center axis. This is a critical feature of the invention in combination with the dimensional proportioning and curvature of radially outward portions of the valve spool to the surrounding valve housing which relates the volume of expanded fluid to the volume of fluid delivered at the outlet orifice. In other words, at the end of zone 2 prior to redirecting the fluid radially outwardly, the fluid has substantially completed its expansion and therefore, preferably but not necessarily, the annular flow area at this point (flow area A, FIG. 2) should approximate the minimum outlet flow area B. In order to prevent fluid from further expanding (overexpansion with respect to the outlet orifice) and to avoid permitting the fluid to shear itself in uncontrolled expansion as it would if it were to continue toward the center axis, the fluid is therefore directed radially outwardly at a consistently controlled rate. By shearing itself is meant a tearing apart of the fluid in an uncontrolled expansion which is a principal source of noise.

It will be understood that the foregoing description has been directed to specific embodiments of the invention which are merely representative. Therefore, in order to appreciate fully the spirit and scope of the present invention, reference is made to the appended claims.

We claim:

1. In a pressure reducing valve for an expandable fluid having a valve housing defining a valve chamber, said housing to be connected to a source of expandable fluid under high pressure for the transmission of said fluid at a reduced pressure to a valve outlet defined by said housing, a seat formed by said housing, a valve spool mounted for reciprocal movement in said housing between fully opened and closed positions, said spool having a mating annular seat sealing against the housing seat, movement of said spool away from said housing seat defining a gradually increasing entrance flow area for said fluid to be admitted to the interior of said housing, the improvement residing in that the valve chamber together with said valve spool defines three longitudinal sequentially related fluid flow zones, said first zone being an entrance zone beginning from said housing seat and extending for the distance of spool movement between fully opened and closed positions, said housing having the internal diameter $D_o$ of said housing seat at the beginning of the entrance zone, said valve spool converging evenly throughout said entrance zone toward the axis of said spool to have a diameter $D_1$, the difference between diameters $D_o$ and $D_1$ defining in combination with surrounding valve housing a maximum entrance cross-sectional flow area which can admit a maximum mass flow of fluid into said chamber; the second flow zone being defined by said spool and adjacent areas of said housing wherein said spool continues to converge smoothly toward its axis to a minimum valve spool diameter $D_2$, the transverse cross sectional annular flow area at $D_2$ being substantially equal to the minimum transverse cross sectional area of said valve outlet such that the converging surface of the spool together with said housing provides a continuous expansion of the fluid at a constantly decreasing rate of expansion but without over-expansion of said fluid; and a third flow zone is defined by said housing and said spool which diverges from its axis in an amount to re-direct the expanded fluid completely to fill the valve chamber adjacent to the diverging portion of the spool with a minimum of further expansion of fluid and optimum flow distribution to said valve outlet.

2. The pressure reducing valve according to claim 1 wherein said spool includes a plurality of circumferential vanes which define axial grooves providing guided flow of fluid passed said spool.

3. The pressure reducing valve according to claim 2 wherein said housing is cylindrical for the distance of spool movement between open and closed positions and has substantially the internal diameter of said valve seat $D_o$, said second flow zone being defined by said spool and adjacent generally cylindrical wall of said housing wherein said spool continues to converge smoothly toward its axis to a minimum spool diameter $D_2$ generally in accordance with the following equation, except for the area occupied by said vanes, $D_2 = (D_o^2 - 4/\pi A_o)^{1/2}$, where $A_o$ equals the minimum transverse cross sectional area of said valve outlet.

4. The pressure reducing valve according to claim 2 wherein adjacent grooves defined by said vanes vary with respect to the initial distance of each groove from said spool seat.

* * * * *